United States Patent
Bareket

(10) Patent No.: US 9,848,575 B2
(45) Date of Patent: Dec. 26, 2017

(54) HUMAN ASSISTED MILKING ROBOT AND METHOD

(75) Inventor: Tal Bareket, Kiryat-Tivon (IL)

(73) Assignee: Mirobot Ltd., Kiryat-Tivon (IL)

(*) Notice: Subject to any disclaimer, the term of this patent is extended or adjusted under 35 U.S.C. 154(b) by 102 days.

(21) Appl. No.: 14/004,697

(22) PCT Filed: Mar. 14, 2012

(86) PCT No.: PCT/IL2012/050088
§ 371 (c)(1),
(2), (4) Date: Sep. 12, 2013

(87) PCT Pub. No.: WO2012/123944
PCT Pub. Date: Sep. 20, 2012

(65) Prior Publication Data
US 2013/0340682 A1    Dec. 26, 2013

Related U.S. Application Data

(60) Provisional application No. 61/453,588, filed on Mar. 17, 2011, provisional application No. 61/453,592, filed on Mar. 17, 2011.

(51) Int. Cl.
*A01J 5/007* (2006.01)
*A01J 5/017* (2006.01)

(52) U.S. Cl.
CPC ............. *A01J 5/007* (2013.01); *A01J 5/017* (2013.01); *A01J 5/0175* (2013.01)

(58) Field of Classification Search
CPC ............. A01J 5/00; A01J 5/003; A01J 5/007
See application file for complete search history.

(56) References Cited

U.S. PATENT DOCUMENTS

| 5,379,721 A | 1/1995 | Dessing et al. |
| 5,697,324 A | 12/1997 | Van der Lely |

(Continued)

FOREIGN PATENT DOCUMENTS

| EP | 2060173 | 5/2009 |
| JP | H 06-70655 A * | 3/1994 |

(Continued)

OTHER PUBLICATIONS

Korunerisu, JPH 06-70655 A, English Translation.*

(Continued)

*Primary Examiner* — Monica L Williams
*Assistant Examiner* — Magdalena Topolski

(57) ABSTRACT

A human operated control device for assisting a plurality of milking robots includes a controller adapted for controlling communication with a plurality of milking robots operated substantially simultaneously, graphical user interface (GUI) adapted for displaying information received from at least one milking robot and for receiving input from a human supervisor for operating the at least one milking robot based on the displayed information, and a processor adapted to convert the input received from the human supervisor into a command for operating the at least one milking robot from which the information was received. A milking robot for operating milking equipment is adapted to operate in one of an automated mode of operation and a human assisted mode of operation.

23 Claims, 10 Drawing Sheets

(56) References Cited

U.S. PATENT DOCUMENTS

| | | | |
|---|---|---|---|
| 5,704,311 A * | 1/1998 | van den Berg | A01J 5/007 119/14.02 |
| 5,743,209 A * | 4/1998 | Bazin | A01J 5/007 119/14.08 |
| 6,009,833 A | 1/2000 | Van der Lely | |
| 6,227,142 B1 | 5/2001 | Birk | |
| 6,705,247 B1 * | 3/2004 | Heslin | A01J 5/007 119/14.02 |
| 7,017,515 B1 * | 3/2006 | Ruda | A01J 5/0175 119/14.01 |
| 7,044,079 B2 | 5/2006 | Deelstra | |
| 7,231,886 B2 | 6/2007 | Van den Berg et al. | |
| 7,246,571 B2 | 7/2007 | Van den Berg et al. | |
| 7,377,232 B2 | 5/2008 | Holmgren et al. | |
| 7,444,961 B1 | 11/2008 | Ellis | |
| 7,447,558 B2 | 11/2008 | Pratt | |
| 7,490,576 B2 | 2/2009 | Metcalfe et al. | |
| 7,559,289 B2 | 7/2009 | Van Liere | |
| 7,568,447 B2 | 8/2009 | Peacock | |
| 7,614,361 B2 | 11/2009 | Van den Berg et al. | |
| 7,726,257 B2 | 6/2010 | Fransen | |
| 7,961,934 B2 | 6/2011 | Thrun et al. | |
| 8,210,122 B2 | 7/2012 | Pettersson et al. | |
| 2002/0033138 A1 | 3/2002 | Brayer | |
| 2002/0152963 A1 | 10/2002 | Vijverberg | |
| 2004/0216679 A1 | 11/2004 | Ealy et al. | |
| 2006/0196432 A1 | 9/2006 | Peacock | |
| 2007/0137580 A1 * | 6/2007 | Brown | A01J 5/007 119/14.14 |
| 2007/0215052 A1 | 9/2007 | Metcalfe et al. | |
| 2007/0227452 A1 * | 10/2007 | Tucker | A01J 5/017 119/14.15 |
| 2007/0277737 A1 * | 12/2007 | Maier | A01J 5/007 119/14.45 |
| 2008/0314324 A1 | 12/2008 | Pettersson et al. | |
| 2010/0017035 A1 | 1/2010 | Van den Berg | |
| 2010/0031889 A1 | 2/2010 | Eriksson et al. | |
| 2010/0186675 A1 | 7/2010 | Van den Berg | |
| 2010/0192862 A1 | 8/2010 | Van den Berg | |
| 2010/0199915 A1 | 8/2010 | Pettersson et al. | |
| 2012/0097107 A1 * | 4/2012 | Torgerson | A01J 5/007 119/14.02 |
| 2013/0036975 A1 * | 2/2013 | Carlsson | A01J 5/01 119/14.08 |
| 2013/0239897 A1 * | 9/2013 | Birk | A01J 5/0175 119/14.04 |
| 2013/0319336 A1 * | 12/2013 | Thompson | A01J 5/007 119/14.02 |
| 2014/0000520 A1 | 1/2014 | Bareket | |

FOREIGN PATENT DOCUMENTS

| | | | |
|---|---|---|---|
| NL | 9100870 | 12/1992 | |
| NL | 1038363 C * | 9/2011 | A01J 5/0175 |
| WO | WO 97/15900 | 5/1997 | |
| WO | WO 98/44782 | 10/1998 | |
| WO | WO 99/30277 | 6/1999 | |
| WO | WO 2005/000009 * | 1/2005 | |
| WO | WO 2009/093965 | 7/2009 | |
| WO | WO 2010/023122 | 3/2010 | |
| WO | WO 2012/123944 | 9/2012 | |
| WO | WO 2012/123948 | 9/2012 | |

OTHER PUBLICATIONS

Dirk, NL 1038363 english machine translation, Sep. 2011.*
"Automatic Milking Machine with Camera Control", Jan Dirk van Mourik, NL 1038363, Sep. 14, 2011, English Translation (Human).*
International Preliminary Report on Patentability dated May 17, 2013 From the International Preliminary Examining Authority Re. Application No. PCT/IL2012/050092.
International Search Report and the Written Opinion dated Jul. 25, 2012 From the International Searching Authority Re. Application No. PCT/IL2012/050092.
International Search Report and the Written Opinion dated Jul. 26, 2012 From the International Searching Authority Re. Application No. PCT/IL2012/050088.
Second Written Opinion dated Mar. 12, 2013 From the International Preliminary Examining Authority Re. Application No. PCT/IL2012/050092.
Notice of Allowance dated Apr. 4, 2014 From the US Patent and Trademark Office Re. U.S. Appl. No. 14/004,706.
Communication Pursuant to Article 94(3) EPC dated Nov. 20, 2014 From the European Patent Office Re. Application No. 12715731.1.
International Preliminary Report on Patentability dated Sep. 26, 2013 From the International Bureau of WIPO Re. Application No. PCT/IL2012/050088.
Communication Pursuant to Article 94(3) EPC dated Dec. 23, 2015 From the European Patent Office Re. Application No. 12715731.1.

* cited by examiner

HUMAN ASSISTED MILKING ROBOT AND METHOD

RELATED APPLICATION APPLICATIONS

This application is a National Phase of PCT Patent Application No. PCT/IL2012/050088 having International filing date of Mar. 14, 2012, which claims the benefit of priority under 35 USC §119(e) of U.S. Provisional Patent Application Nos. 61/453,588 filed Mar. 17, 2011 and 61/453,592 also filed Mar. 17, 2011. The contents of the above applications are all incorporated herein by reference.

PCT Patent Application No. PCT/IL2012/050092 having International filing date of Mar. 14, 2012, entitled "System and method for three dimensional teat modeling for use with a milking system" and claiming priority from U.S. Provisional Patent Application No. 61/453,588 filed Mar. 17, 2011 and U.S. Provisional Patent Application No. 61/453,592 also filed Mar. 17, 2011, describes apparatus and methods related to the present invention which was invented by the present inventor and which is incorporated by reference as if fully set forth herein.

FIELD OF THE INVENTION

The present invention, in some embodiments thereof, relates to milking robots and, more particularly, but not exclusively, to teat locating for use with a milking robot.

BACKGROUND OF THE INVENTION

To alleviate the labor involved in milking, much of the milking process has been automated. Known milking machines have automated milk extraction and automatic cluster removal is available to remove milking equipment after milking. To fully automate the milking process, milking robots have also been developed. Typically, robotic milking machines aim to perform the tasks of recognizing and locating the cow teats; attaching the teat cups; together with, cleaning, pre-milking, milking and disinfecting the udder and teats of the cow. Due to the working environment and the wide variation in teat size, shape and orientation, the step of locating the teats has proved difficult. Inherent movement of the cow has also lent to the difficulty in teat locating. As such, a variety of systems and methods have been attempted for locating the cow teats with variable success rates. The achievable success rate and the associated costs involved in teat locating are important issue when developing robotic milking machines.

U.S. Pat. No. 6,227,142 entitled "Apparatus and Method for Recognizing and Determining the Position of a Part of an Animal," the contents of which is incorporated herein by reference, describes capturing an image of an area illuminated with structured light, processing the image to identify a specific part of the animal, determining a location of the part in Three Dimensions (3D), and providing information for guiding an animal related device towards the determined location. The disclosure is specially toward determining a position of an animal part (a teat) and does not provide information regarding an orientation of the teat.

U.S. Pat. No. 7,490,576 entitled "Time of Flight Teat Location System," the contents of which is incorporated herein by reference, describes a teat location system for automated milking systems. The system has a light projection source and a special camera having a two dimensional array of pixels, each of which is capable of returning time of flight information as well as intensity to obtain 3D positioning of the teat.

U.S. Pat. No. 7,568,447 entitled "Improvements in or Related to Milking Machines," the contents of which is incorporated herein by reference, describes a teat locating sensor for use in robotic milking machines and teat disinfection units. The captured image is processed by applying an edge detector to provide an edge image of the udder. A Hough transform is applied for detecting edges using semi-circles and near vertical forms. A feature detector then matches these to provide teat ends and teat sides and thus produces a teat location map. At least two cameras are required for locating the teats in 3D.

US Patent Application Publication No. 2010/0186675 entitled "Implement for Automatically Milking a Dairy Animal," the contents of which is incorporated herein by reference, describes an implement for automatically milking a dairy animal that includes a milking parlor, a sensor for observing a teat, and a milking robot for automatically attaching a teat cup to the teat. The sensor comprises a radiation source for emitting light, a receiver for receiving electromagnetic radiation reflected from the dairy animal, a lens, and sensor control unit. The sensor includes a matrix with a plurality of rows and a plurality of columns of receivers. The sensor control unit is designed to determine for each of the receivers a phase difference between the emitted and the reflected electromagnetic radiation in order to calculate the distance from the sensor to a plurality of points on the part to be observed of the dairy animal.

SUMMARY OF THE INVENTION

According to an aspect of some embodiments of the present invention there is provided a milking robot that is designed to be operated in an automated mode without human assistance and switch to a human assisted mode when failing to perform a given task, e.g. attaching a milking cluster to the teats. According to some embodiments of the present invention, during human assisted operation, the milking robot is operable to receive input from a stand-by supervisor via a human operated control unit in communication with the milking robot. Optionally, the stand-by supervisor provides input to correct identification and location of a teat as computed by the milking robot. Optionally, the stand-by supervisor provides input to remotely control robotic arms and/or milking equipment of the milking robot.

An aspect of some embodiments of the present invention provides for a human operated control device for assisting a plurality of milking robots, the control device comprising: a controller adapted for controlling communication with a plurality of milking robots, wherein the plurality of milking robots are operated substantially simultaneously; graphical user interface (GUI) adapted for displaying information received from at least one milking robot and for receiving input from a human supervisor for operating the at least one milking robot based on the displayed information; and a processor adapted to convert the input received from the human supervisor into a command for operating the at least one milking robot from which the information was received.

Optionally, the information displayed by the GUI includes an image captured by the at least one milking robot.

Optionally, at least a portion of the image is an image of at least one teat of a diary animal for milking by the at least one milking robot.

Optionally, at least a portion of the image is an image of at least one robotic arm or platform of the milking robot.

Optionally, at least a portion of the image is an image of milking equipment operated by the milking robot.

Optionally, the information displayed by the GUI includes identification of a location of the at least one teat in the image as identified by the milking robot.

Optionally, the information displayed by the GUI indicates a location of the at least one teat in space, wherein the location is computed by the milking robot.

Optionally, the information displayed by the GUI indicates an orientation of the at least one teat, wherein the orientation is computed by the milking robot.

Optionally, the information displayed by the GUI includes a GUI animation of the at least one teat.

Optionally, the GUI animation is defined by a three dimensional model of the at least one teat.

Optionally, the GUI animation of the at least one teat is displayed over the captured image.

Optionally, the GUI animation is aligned over an identified location of the at least one teat in the image.

Optionally, a position of the GUI animation is adapted to be altered in response to the input from the human supervisor.

Optionally, the processor is adapted to provide input to the milking robot regarding location or orientation of the teats based on the altered position of the GUI animation.

Optionally, the input from the human supervisor includes information for correcting identification, location or orientation of the at least one teat as computed by the milking robot.

Optionally, the processor is adapted to compute a corrective action based on the input received.

Optionally, the corrective action is for correcting a location or orientation of the teats as computed by the milking robot.

Optionally, the GUI is adapted for receiving input from a human supervisor to alter a position of a sensor associated with the milking robot, and wherein the controller is adapted to communicate a command to the milking robot to alter the position of the sensor in response to the input from the human supervisor, said sensor adapted to sense location of at least one teat for milking.

Optionally, the GUI is adapted to display a GUI animation of at least one teat cup associated with the milking robot, wherein the graphical display provides information regarding position of the at least one teat cup.

Optionally, the GUI animation of the at least one teat cup provides information regarding the position of the at least one teat cup with respect to at least one teat of a dairy animal for milking.

Optionally, a position of the GUI animation of the at least one teat cup is adapted to be altered in response to the input from the human supervisor.

Optionally, the processor is adapted to provide input to the milking robot regarding motion control of at least one robotic arm or robotic platform of the milking robot based on input from the human supervisor to altered position of the GUI animation of the at least one teat cup.

Optionally, the information displayed by the GUI provides information regarding malfunction of a feature of the milking robot.

Optionally, the communication between the human operated control device and a plurality of milking robots is by remote connection.

Optionally, the controller is adapted to communicate with the plurality of milking robot substantially simultaneously.

An aspect of some embodiments of the present invention provides for a milking robot for operating milking equipment comprising: a location computation unit adapted for locating at least one teat for milking; at least one robotic arm or robotic platform adapted for maneuvering milking equipment; a motion control unit adapted for controlling movement of the at least one robotic arm or robotic platform; and a controller for controlling operation of the milking robot and the milking equipment, wherein the controller is adapted operate in one of an automated mode of operation and a human assisted mode of operation.

Optionally, the controller is adapted to switch from the automated mode of operation to the human assisted mode of operation in response to failure to perform a task.

Optionally, the controller is adapted to switch from the automated mode of operation to the human assisted mode of operation in response to failure to attach a milking cluster to a dairy animal within a predefined time limit or after a predefined number of trails.

Optionally, the controller is adapted receive input from a control device that is human operated during the human assisted mode.

Optionally, the controller is adapted to control the location computation unit based on the input received from the control device that is human operated.

Optionally, the controller is adapted to control the motion control unit based on the input received from the control device that is human operated.

Optionally, the controller is adapted to control the milking equipment based on the input received from the control device that is human operated.

Optionally, the controller is adapted to transmit information to a control device that is human operated during the human assisted mode.

Optionally, the controller is adapted to transmit data from the location computation unit to the control device that is human operated.

Optionally, the data includes images of at least one teat for milking captured by the location computation unit.

Optionally, the controller is adapted to transmit information regarding positioning of the at least one robotic arm or robotic platform.

Optionally, the controller is adapted to transmit information regarding an operational status of the milking robot or the milking equipment.

Optionally, the controller is adapted to transmit information regarding a dairy animal to be milked by the milking robot.

Optionally, the controller is adapted to communicate with a control device that is human operated.

Optionally, the controller is adapted to communicate with a control device that is human operated by remote communication.

Optionally, the milking robot comprises at least one sensor for sensing completion of a milking task.

Optionally, the at least one sensor includes a sensor for sensing attachment of a teat cup to a teat for milking.

Optionally, the at least one sensor is an optical sensor mounted on the teat cup, wherein the optical sensor is adapted to sense a break in the line of sight due to insertion of a teat into the teat cup.

An aspect of some embodiments of the present invention provides for a method for performing milking tasks on a dairy animal with a milking robot, the method comprising: operating a milking robot in an automated mode without human intervention, wherein the milking robot is adapted to perform milking tasks on a dairy animal; detecting failure in performing a milking task, wherein the failure is detected by the milking robot; switching operation of the milking robot from the automated mode of operation to a human assisted mode of operation in response to detecting the failure; transmitting information from the milking robot to a control device that is operated by a human supervisor; and completing the milking task with the milking robot based on input received from a control device operated by a human supervisor.

Optionally, the method comprises switching operation of the milking robot from the human assisted mode of operation to the automated mode of operation in response to completing the milking task.

Optionally, transmitting information from the milking robot to the control device includes transmitting image data captured by the milking robot.

Optionally, the transmitting information from the milking robot to the control device includes transmitting information regarding a computed location of the teats for milking.

Optionally, the input received from the control device to complete the milking task includes input for correcting a computed location of the teats for milking.

Optionally, the input received from the control device to complete the milking task includes a command to alter a position of a camera of the robotic milking system.

Optionally, the input received from the control device to complete the milking task includes a command for remotely controlling at least one robotic arm or at least one robotic platform.

Optionally, the input received from the control device to complete the milking task includes a command for updating an operating parameter of the milking robot or of milking equipment associated with the milking robot.

Optionally, the milking task includes attaching a milking cluster to teats of a diary animal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
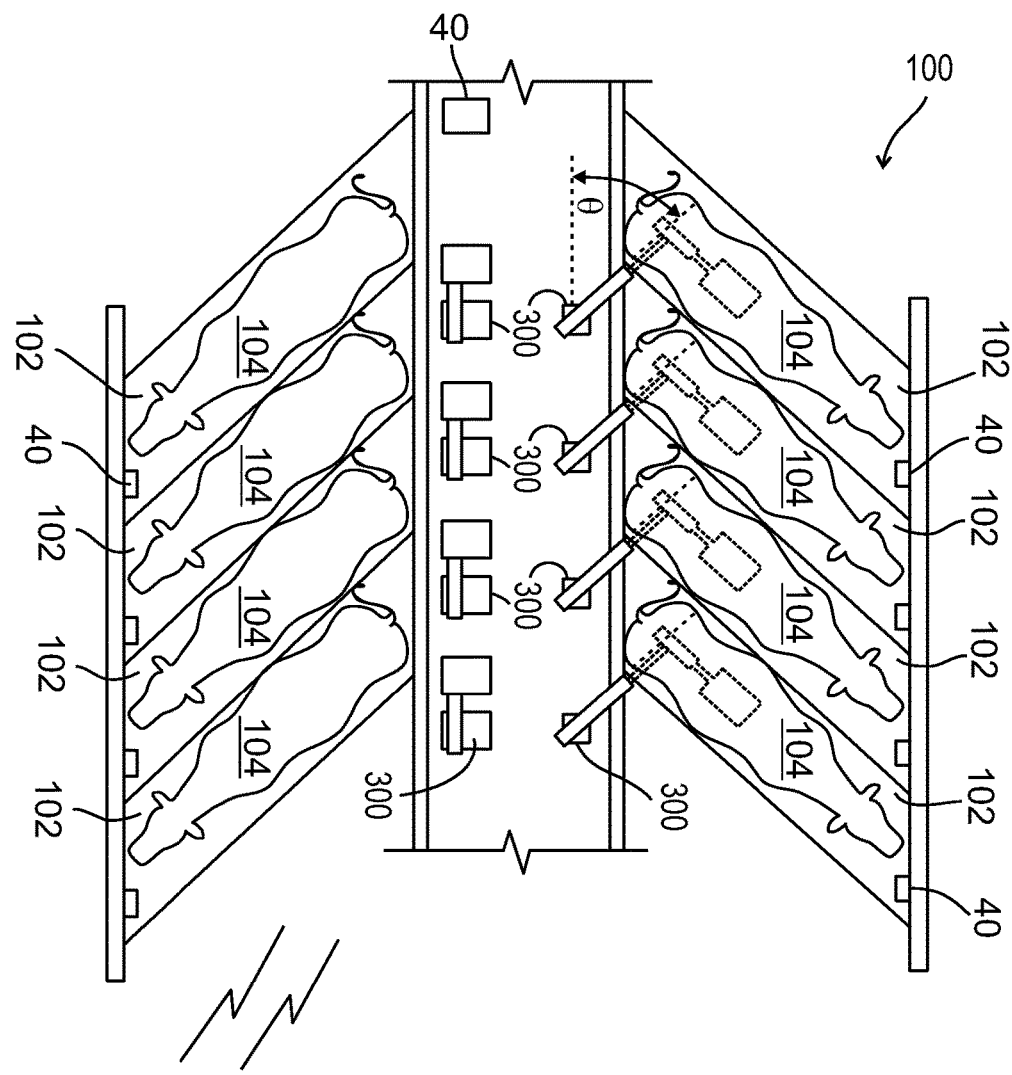
FIG. 1 is a simplified schematic drawing of an exemplary milking parlor operated with human assisted milking robots in accordance with some embodiments of the present invention.

The present invention, in some embodiments thereof, relates to milking robots and, more particularly, but not exclusively, to teat location for use with a milking robot.

The present inventor has found that by adding human assistance capability to a milking robot, a high success rate typically required for milking robots as well as the complexity and cost of the system can be reduced. According to some embodiments of the present invention, the milking robot is designed to operate automatically without human assistance at a defined success rate, e.g. 70% or more success rate, and to request human assistance during instances when automatic location and/or operation has not been successful. Since a dairy typically includes a plurality of milking robots in a same location, e.g. in a milking parlor, a single stand-by supervisor can be on stand-by to assist a plurality of milking robots during operation of the systems at a relatively low added cost per system. Optionally, the stand-by supervisor can assist the milking robots by remote connection.

According to some embodiments of the present invention, a milking robot is operable to automatically attach teat cups for milking a dairy animal to the teats of the animal with a given success rate, e.g. 70%-90% success rate and to receive input from a human operated device during failure performing a task, e.g. failure in attaching to the teats. The present inventor has found that failure of a milking robot to attach a milking cluster to teats of a dairy animal is typically due to errors in identifying and locating the teats. Failure to attach to the teats may be due for example to an unexpected size, structure, and/or orientation of one or more teats, may be due to an unexpected number of teats, an obstructed view of the teats and/or malfunction of the milking robot.

In some exemplary embodiments, the milking robot includes one or more sensors for sensing success of teat cup attachment during operation. Optionally, output from one or more devices associated with the milking robot, e.g. milking meter or vacuum system is used to determine success of teat cup attachment. Optionally, an optical sensor is incorporated in the teat cup to identify a presence of a teat within each of the cups. Optionally, success is reported only if attachment is achieved within a defined time limit.

According to some embodiments of the present invention, the human assisted milking robot communicates with a human operated control device that enables the stand-by supervisor to receive information from at least one milking robot and/or transmit commands (and/or information) to a control unit of at least one milking robot. Typically, human operated control device communicates with a plurality of milking robots, all the milking robots in a milking parlor and/or a dairy farm.

According to some embodiments of the present invention, a report of failure is accompanied by transmittal and/or display of information to the human operated control device that can be used by the stand-by supervisor to intervene and assist in completing the failed task, e.g. attachment of the teat cups. In some exemplary embodiments, images of the teats provided by the milking robot and information regarding predicted location of the teats are displayed on human operated control device. Often, a stand-by supervisor can easily and quickly identify errors in identification and location of the teats by visually inspecting the images and provide input to help the milking robot properly identify and locate the teats. In some exemplary embodiments, 3D model of the teats constructed by the milking robot is displayed on the human operated control device for inspection. Optionally, the 3D model is over-laid on a real image of the teats to provide additional information to the stand-by supervisor from which errors can be recognized.

According to some embodiments of the present invention, the stand-by supervisor provides input via the human operated control device to the milking robot to correct identification and location of the teats. Optionally, the stand-by supervisor provides the input by selecting an area on one or more images displayed on the human operated control device that was incorrectly identified as a teat and/or missed. Optionally, selection is converted by the human operated control device into input that can be used by the milking robot to reconfigure identification and location of the teats. Optionally, the stand-by supervisor provides input via the human operated control device for maneuvering a camera (or other detecting device used by a milking robot to locate the teats), e.g. by remote control to provide a better view of the teats from which the milking robot can identify and locate one or more of the teats.

In some exemplary embodiments, the stand-by supervisor provides input via the human operated control device for maneuvering one or more robotic arms and/or platform of the milking robot, e.g. by remote control. Optionally, during remote control of robotic arms and/or platform of the milking robot, an image of the arm (and/or platform) or milking equipment manipulated by the arm is displayed on the human operated control device.

Typically, the human operated control device communicates and translates input from the stand-by supervisor to the milking robot into commands that can be executed by the milking robot. Optionally input provided by the stand-by supervisor is also stored and used to improve performance in subsequent milking sessions, e.g. subsequent milking session for a specific dairy animal.

In some exemplary embodiments, the milking robot allows a user to manually and directly move the robotic arm and/or cluster and attach the cluster to the teats. Optionally, the milking robot may sense manual manipulation of a robotic arm and/or joint based on detected current on a motor of the arm (or joint). Optionally, the milking robot neutralizes one or more joints of the system in response to sensing manual manipulation of that joint so that a user can easily manipulate the joint without imposed resistance of the motor.

Although, human intervention is typically initiated by an alert received from the milking robot (by remote reporting), a stand-by supervisor may also initiate human intervention by manually manipulating the joints and/or querying a milking robot.

According to some embodiments of the present invention, the user control device is operable to control a plurality of milking robots operating simultaneously. Optionally, the user control device communications with each of the milking robots by remote connection. In some exemplary embodiments, the user control device is a portable device that a stand-by supervisor is able to carry to different stalls for hook up and control of a specific milking robot.

Referring now to the figures, FIG. 1 illustrates a simplified schematic drawing of an exemplary milking parlor operated with human assisted milking robots in accordance with some embodiments of the present invention. According to some embodiments of the present invention, a milking parlor 100 includes a plurality of stalls 102 for milking diary animals 104 each equipped with a milking robot 300. Typically, each milking robot 300 operates to attach a milking cluster to teats of animal 104 and extract milk from animal 104. In some exemplary embodiments, milking robot 300 additionally performs other milking procedures such as cleaning, pre-milking, milking and disinfecting an udder and teats of animal. Optionally, a milking parlor includes 6-100 stalls for milking cows.

According to some embodiments of the present invention, milking robot 300 generally operates in an automated mode, e.g. performing milking tasks without human assistance but is also capable of being operated with human assistance and/or guidance. In some exemplary embodiments, milking robot 300 requests human intervention when the milking robot fails to perform a task. Optionally, supervisor 200 initiates human intervention. Optionally, human intervention can be by remote control in a human assisted mode of operation and/or by manual manipulation of robot 300 in a manual mode of operation.

According to some embodiments of the present invention, during a human assisted mode of operation, human assisted operation is achieved via a human operated control device 500 in communication with one or more milking robots 300. According to some embodiments of the present invention, a single human operated control device is used to communicate and assist a plurality of milking robots 300, e.g. all the milking robots in milking parlor 100. Optionally, a single human operated control device 500 is used to communicate and assist milking robots 300 in more than one milking parlor. Optionally, more than one human operated control device 500 (and stand-by supervisor 200) is used to communicate and assist milking robots 300 in a single milking parlor, e.g. two stand-by supervisors 200, each equipped with a human operated control device 500 may simultaneously supervise one or more milking parlors.

Although, human operated control device 500 can simultaneously communicate with a plurality of the milking robots, human assistance is typically provided to one milking robot 300 at a time. In some exemplary embodiments, human operated control device 500 is programmed to query each of the milking robots 300 at predefined intervals and/or predefined time periods. Optionally, malfunction of milking robot 300 and/or failure of milking robot 300 to perform a task are communicated in response to a query that is initiated by human operated control device 500. The query may be initiated by the stand-by supervisor 200 operating human operated control unit 500 and/or may be initiated by human operated control unit 500 itself, e.g. automatically.

Optionally, human operated control unit 500 detects communication failures with a milking robot and reports the failure to the stand-by supervisor. Optionally, the human operated control unit 500 detects malfunctioning of a milking robot, e.g. malfunction of a robotic arm, malfunction of a camera associated with the milking robot, and malfunction of a lens of the camera due to dirt on the lens and reports the failure to the stand-by supervisor and displays information to the supervisor.

According to some embodiments of the present invention, human operated control device 500 is in the form of a personal computer and/or a handheld device that is adapted to communicate with a plurality of milking robots 300. Optionally, communication between human operated control device and each of milking robots 300 is by tethered connection and/or by wireless connection. Optionally, a portable human operated control device can also be temporarily connected to a specific milking robot to perform specific tasks, e.g. by tethered or wireless connection. According to some embodiments of the present invention, stand-by supervisor 200 remotely operates the milking equipment with one or more user input devices, e.g. a joystick, mouse, pointer, touch screen and keyboard associated with human operated control device 500.

According to some embodiments of the present invention, stand-by supervisor 200 receives information from milking robot 300 via human operated control device 500, and based on the received information provides input to human operated control device 500 to assist milking robot 300 in completing the task, e.g. attaching the cluster to the teats. Typically, the received information includes images captured by an imaging unit and/or camera associated with the milking robot, e.g. for identifying and location the teats. Optionally, data received by human operated control device 500 is in response to a query by human operated control device 500. According to some embodiments of the present invention, information displayed on device 500 is a raw image captured by the camera of a milking robot. Optionally the information displayed includes a graphical display of a 3D model of an object, e.g. a cow teat and/or a teat cup as calculated by the milking robot.

In some exemplary embodiments, input from stand-by supervisor 200 is based on human inspection of capture images. Optionally, supervisor 200 provides input to assist a milking robot in properly identifying teats from image data. Optionally, input from stand-by supervisor 200 includes motion control input to maneuver position of a camera providing the image data. Optionally, input from stand-by supervisor 200 includes motion control input to remotely maneuver milking equipment robotic arms 55 to move teat cups 60. Optionally, input from stand-by supervisor 200 includes input to update parameters of the milking robot.

According to some embodiments of the present invention, human operated control device 500 additionally receives input from one or more sensors and/or queries one or more sensors positioned in milking parlor 100. Optionally, one or more sensors 40 provide information specific to a particular milking stall 102, milking robot 300 and/or dairy animal 104. Optionally, sensors 40 provide information regarding identity of dairy animal 104 in a specific stall 102 and additional information, e.g. milk output, last milking session, etc. Optionally, one or more sensors 40 provide general information regarding conditions in milking parlor 100.

According to some embodiments of the present invention, stand-by supervisor a supervisor can query a specific stall (or milking robot 300) on demand and initiate a change in an operational mode of the milking robot, e.g. automated mode, human assisted mode. In some exemplary embodiments, data regarding milking is automatically transmitted to human control device 500 without a query. Optionally, a stand-by supervisor intervenes in operation of milking robot 300 with human control device 500, e.g. to requests that a specific task be performed on a specific cow based on input received. Optionally, the task can be human assisted with human control device 500.

In some exemplary embodiments, supervisor 200 can directly initiate a manual mode by manually manipulating milking equipment to perform a task, e.g. by hand. Optionally, a milking robot senses manual manipulation and neutralizes robotic arms of the milking robot so that a supervisor can manually manipulate the milking equipment to perform a task, e.g. by hand with reduced resistance.

Figure 2:
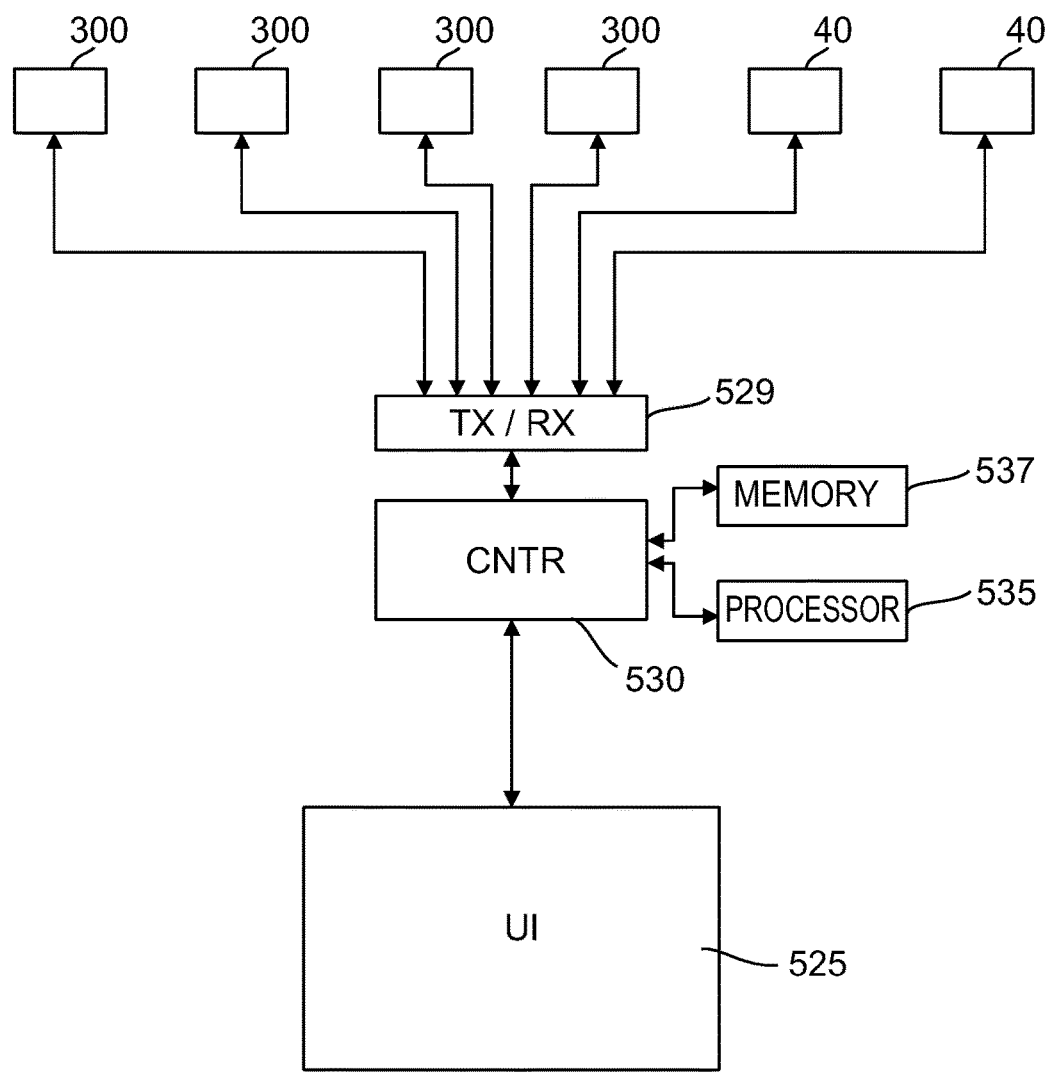
FIG. 2 is a simplified block diagram of an exemplary human operated control device providing remote assistance to a plurality of milking robots in accordance with some embodiments of the present invention.

Reference is now made to FIG. 2 illustrating a simplified block diagram of an exemplary human operated control device providing remote assistance to a plurality of milking robots in accordance with some embodiments of the present invention. According to some embodiments of the present invention, a human operated control device 500 includes a User Interface (UI) 525 for displaying information received from a milking robot 300 and for receiving input from one or more user input devices, e.g. keyboard, mouse, joystick through which a stand-by supervisor can communicate with human operated control device 500, and a controller 530 for controlling operation of human operated control device 500. Typically, human operated control device 500 additionally includes a processor 535 and memory 537 for processing and storing data. Optionally, human operated control device 500 is based on a standard or off-the-shelf handheld or notebook computer. In some exemplary embodiments, user input device includes at least one joystick for remote control of robotic arm movement. Optionally, user input devices includes standard user input devices typically included in handheld or notebook computers.

According to some embodiments of the present invention, controller 530 includes and/or is associated with a communication unit 529, e.g. a transmitter and receiver for communication with external devices. Optionally, communication unit 529 provides communication by one of tethered or remote connection. According to some embodiments of the present invention, controller 530 transmits commands and/or data to any one or more milking robots 300 and also receives input from milking robots 300. In some exemplary embodiments, human operated control device 500 additionally communicates with sensors 40, e.g. a temperature sensor, a sensor to sense opening or closing of a gate through which a diary animal passes, sensors to identify dairy animal 104 in a stall 102. In some exemplary embodiments, controller 530 queries one or more milking robots 300 and/or sensors 40 to initiate communication.

Figure 3:
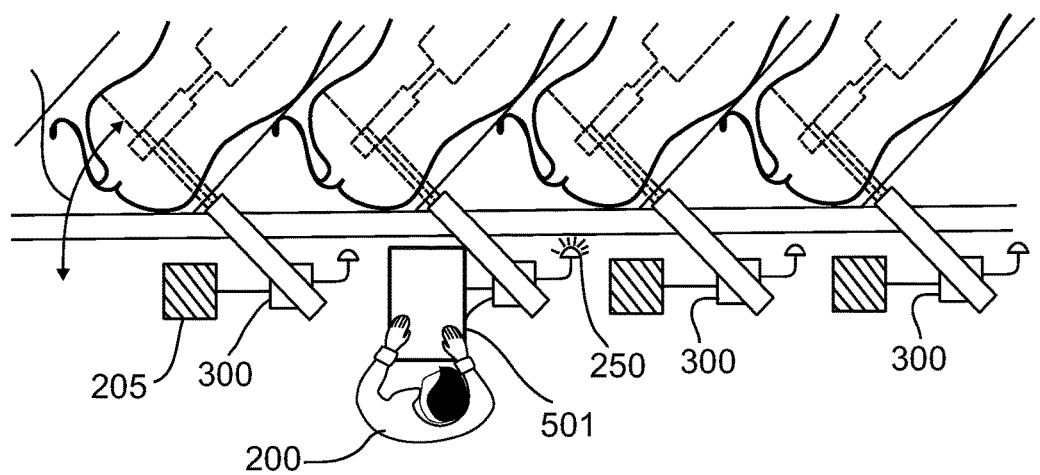
FIG. 3 is a simplified schematic drawing of a milking parlor including milking robots that are human assisted by local connection with a portable human operated control device in accordance with some embodiments of the present invention.
Figure 4:
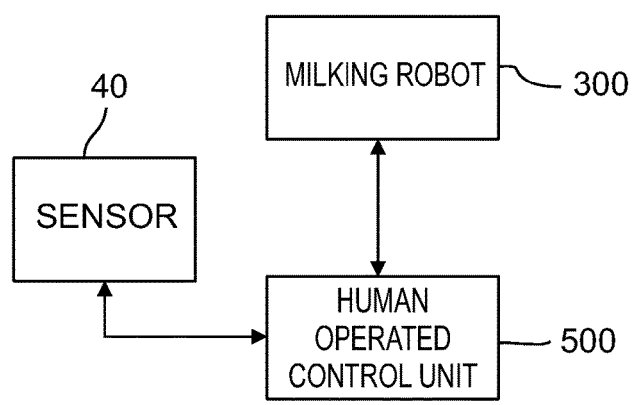
FIG. 4 is simplified block diagram of an exemplary human operated control device providing assistance to a single milking robot in accordance with some embodiments of the present invention.

Reference is now made to FIG. 3 illustrating a simplified schematic drawing of a milking parlor including milking robots that are human assisted by local connection with a portable human control device and to FIG. 4 illustrating a simplified block diagram of an exemplary human control device providing assistance to a single milking robot both in accordance with some embodiments of the present invention. According to some embodiments, a milking parlor includes a plurality of milking robots 300, each of which can be operated in a human assisted mode when connected to a human control device 501, e.g. by dedicated connection. In some exemplary embodiments, milking robots 300 are associated with an alert device such as an alert lamp 250 and/or an alert alarm that signals to stand-by supervisor 200 that human assistance is requested. In some exemplary embodiments, supervisor 200 establishes dedicated connection with one milking robot 300, e.g. the milking robot that initiated the alert and provides human assistance to the milking robot via human control device 501. Optionally, connection between human control device 501 and a robot 300 is a tethered connection using a connector 205. Optionally, connection between human operated control device 501 and a milking robot 300 is wireless, e.g. with Bluetooth connection and supervisor 200 selects a specific milking robot 300 for communication. In some exemplary embodiments, human operated control device 501 additionally communicates and/or receives data from one or more sensors 40. Communication with sensors 40 may be by one or more of by wireless and tethered connection.

Figure 5:
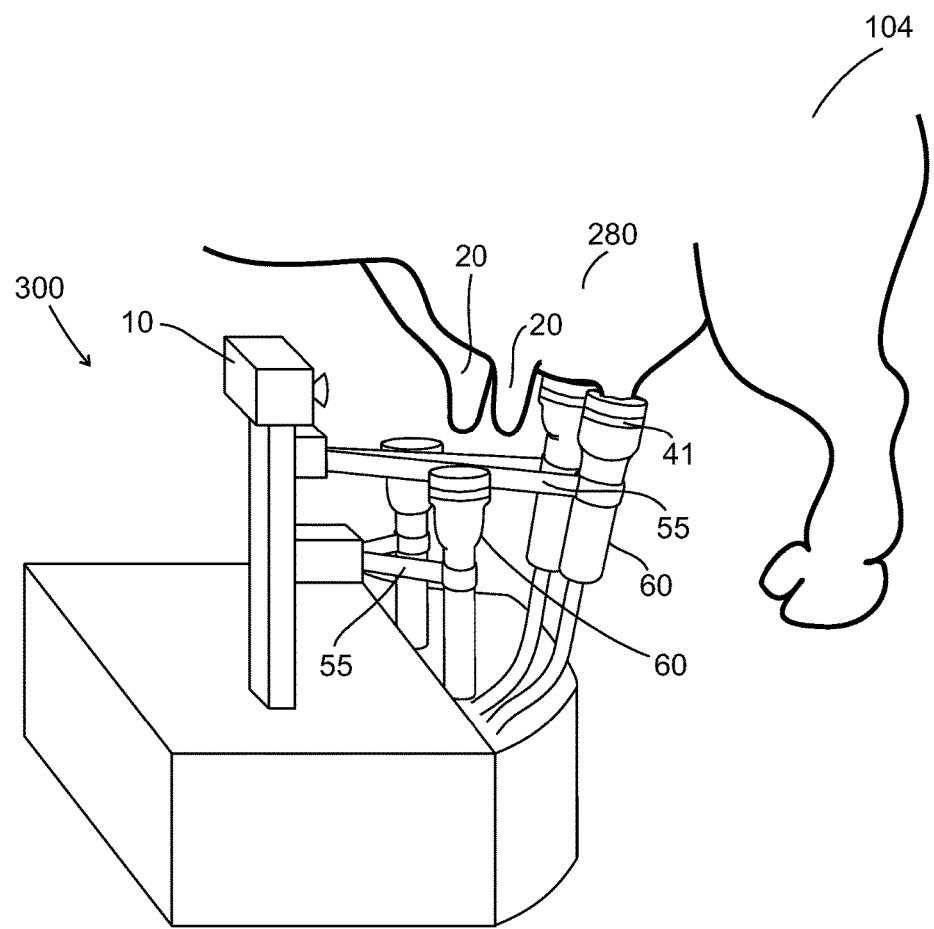
FIG. 5 is a simplified schematic drawing of an exemplary human assisted milking robot in accordance with some embodiments of the present invention.
Figure 6:
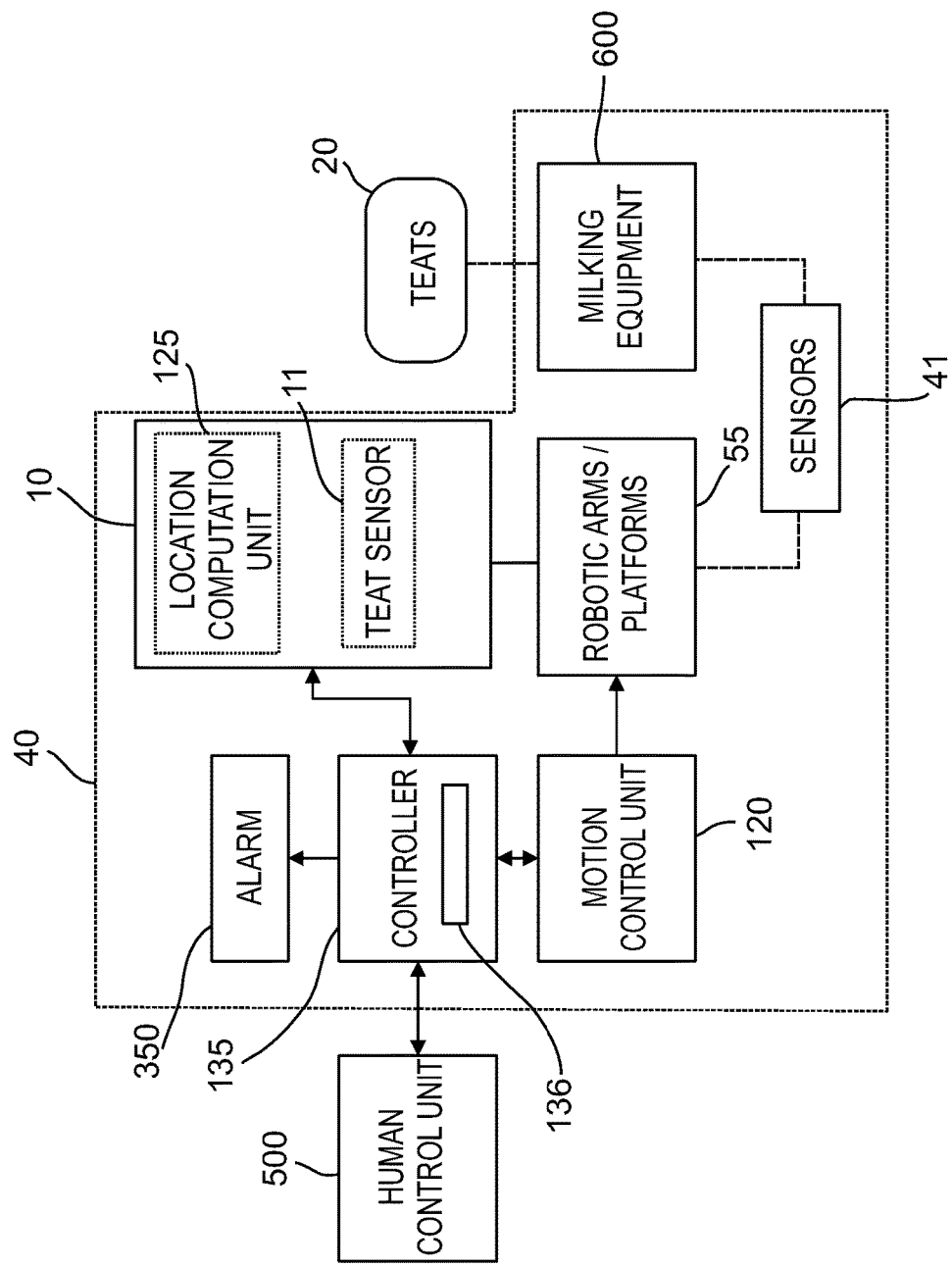
FIG. 6 is a simplified block diagram of an exemplary human assisted milking robot in accordance with some embodiments of the present invention.

Reference is now made to FIG. 5 illustrating a simplified schematic drawing of an exemplary human assisted milking robot and FIG. 6 illustrating a simplified block diagram of an exemplary human assisted milking robot, both in accordance with some embodiments of the present invention. Typically, milking robot 300 attaches a milking cluster including teat cups 60 to teats 20 of animal 104 and extracts milk from the animal. In some exemplary milking robot 300 additionally performs other milking procedures such as cleaning, pre-milking, milking and disinfecting an udder 280 and teats 20 of animal 104. Additional milking equipment typically required for performing cleaning, pre-milking, milking and disinfecting is not shown in FIG. 5 for simplicity.

Typically, milking robot 300 includes a teat modeling unit and/or a teat sensor 10 for identifying and locating positioning of the teats and one or more robotic arm 55 for maneuvering equipment for performing tasks, e.g. maneuvering teat cups 60 to attach to teats 20. In some exemplary embodiments, teat modeling unit 10 includes teat sensor 11 for sensing the position of the teats and a location computation unit 125 for computing position of the teats based on the sensed data. Optionally, teat sensor 11 includes an illumination unit 115 for illuminating the teats and a camera 105 for capturing images of teats 20. Optionally, illumination unit 115 illuminates with a structured light pattern, e.g. a matrix of dots and images of the reflected light pattern, e.g. reflected off the teats is captured by camera 105. According to some embodiments of the present invention, location computation unit 125 analyzes the reflected pattern to determine position and optionally orientation of the teats in 3D. In some exemplary embodiments, location computation unit calculates 3D models of teats 20. Optionally, the teats are modeled as cylinder shaped structures. In some exemplary embodiments, teat modeling unit 10 also identifies and locates position of milking equipment, e.g. teat cups 60. Optionally position and orientation of the teats cups 60 are also modeled as 3D structures, e.g. cylindrical structures. Optionally position and orientation of the teats is determined in relation to positions and orientations of teat cups 60.

Optionally, teat modeling unit 10 does not include a camera and/or an illumination unit and the teats may be identified and located using other known sensors and methods. In some exemplary embodiments, milking robot 300 includes a camera that is specifically dedicated for providing image data to a stand-by supervisor, e.g. during a human assisted mode of operation. Optionally, in such a case, the camera may be separate unit that is not included as part of teat modeling unit 10. Optionally, in cases when teat modeling unit 10 is a camera based sensor, the camera used for providing image data to a stand-by supervisor is a camera other than camera 105 used for identifying, locating and/or modeling the teats.

Typically, a motion control unit 120 controls and manipulates position and orientation of one or more robotic arms and/or platforms 55. Optionally, one or more robotic arms and/or platforms 55 are used to manipulate teat modeling unit 10. Optionally, location computation unit 125 process image data obtained from teat modeling unit 10 and provides input to motion control unit 120 to alter a field of view of teat modeling unit 10. In some exemplary embodiments, a success rate of location computation unit 125 is typically less than 100% success and human assistance is requested and/or relied upon to correct errors and/or compensate for errors in computation.

According to some embodiments of the present invention, one or more sensors 41 are used to monitor operation of milking robot 300. In some exemplary embodiments, a sensor 41 senses attachment of teat cup 60 to teat 20. In some exemplary embodiments, each teat cup includes sensor 41 for sensing attachment of each teat cup to its teat. Optionally, sensor 41 for sensing attachment is an optical sensor including a light beam source and a photocell. Optionally, upon successful attachment to teat 20, the light beam will be blocked and the photocell will not receive input from the beam. Optionally, a sensor for sensing milk flow out of a teat and/or a pressure sensor for sensing vacuum pull established in the teat cup is used to sense attachment of teat 20 to teat cup 60. In some exemplary embodiments, an alarm 350 is activated in response to determined failure.

According to some embodiments of the present invention, sensors 41 is used to track the number of attempts and/or the time period in which milking robot 300 attempts to perform a task, e.g. identify, locate and attach to the teats and reports failure if the number of attempts and/or the time period exceeds a pre-defined limit. Typically, failure is reported when at least one teat cup of a cluster fails to attach to a teat.

According to some embodiments of the present invention, a controller 135 controls operation of milking robot 300 and communication with a human operated control device 500. According to some embodiments of the present invention, controller 135 includes and/or is associated with a communication unit 136, e.g. a transmitter and receiver for communication with external devices. Optionally, communication unit 136 provides communication by one of tethered or remote connection. In some exemplary embodiments, controller 135 controls switching operational modes of milking robot 300. Optionally, mode switching is initiated, by milking robot 300 (controller 135), human operated control device 500 and/or directly by supervisor 200. Typically in fully automated mode, milking robot 300, identifies, locates and attaches the teat cups to the teats automatically, e.g. without human intervention. Typically, during human assisted mode, controller 135 transmits information to human operated control device 500, e.g. image data from teat modeling unit 10 and waits to receive commands (or requests input) for operating milking robot.

In some exemplary embodiments, human operated control device 500 can provide different types of input for assisting milking robot 300. Optionally, input provided is for correcting computed location and/or identification of teats 20, for altering resolution of a computed model, for altering a field of view of teat modeling unit 10, for remotely manipulating positioning of milking equipment 600, and/or for altering operating parameters of the milking robot, e.g. parameters of teat modeling unit 10 and/or milking equipment 600. Optionally, input provided by human operated control device 500 is for altering a wavelength and/or intensity of illumination unit 115, frame rate and/or shutter speed of camera 105, a defined maximum expected length of a teat and/or defined maximum expected angle of a teat used by location computation unit 125. In some exemplary embodiments, controller 135 identifies the type of input received and directs commands to specific elements of milking robot 300 based on the received input, e.g. directs commands to location computation unit 125 to correcting computed location and/or identification of teats 20 and/or directs commands to motion control unit 120 for maneuvering milking equipment.

Typically, a default mode of milking robots 300 is the fully automated mode. According to some embodiments of the present invention, when a milking robot 300 is unable to perform a designated task, e.g. when failure is reported, a mode switch is initiated, e.g. by controller 135, by human operated control device 500 and/or directly by supervisor 200, so that a task can be completed with human assistance. Optionally, once the task is completed, controller 135 reverts back to fully automated mode.

Figure 7:
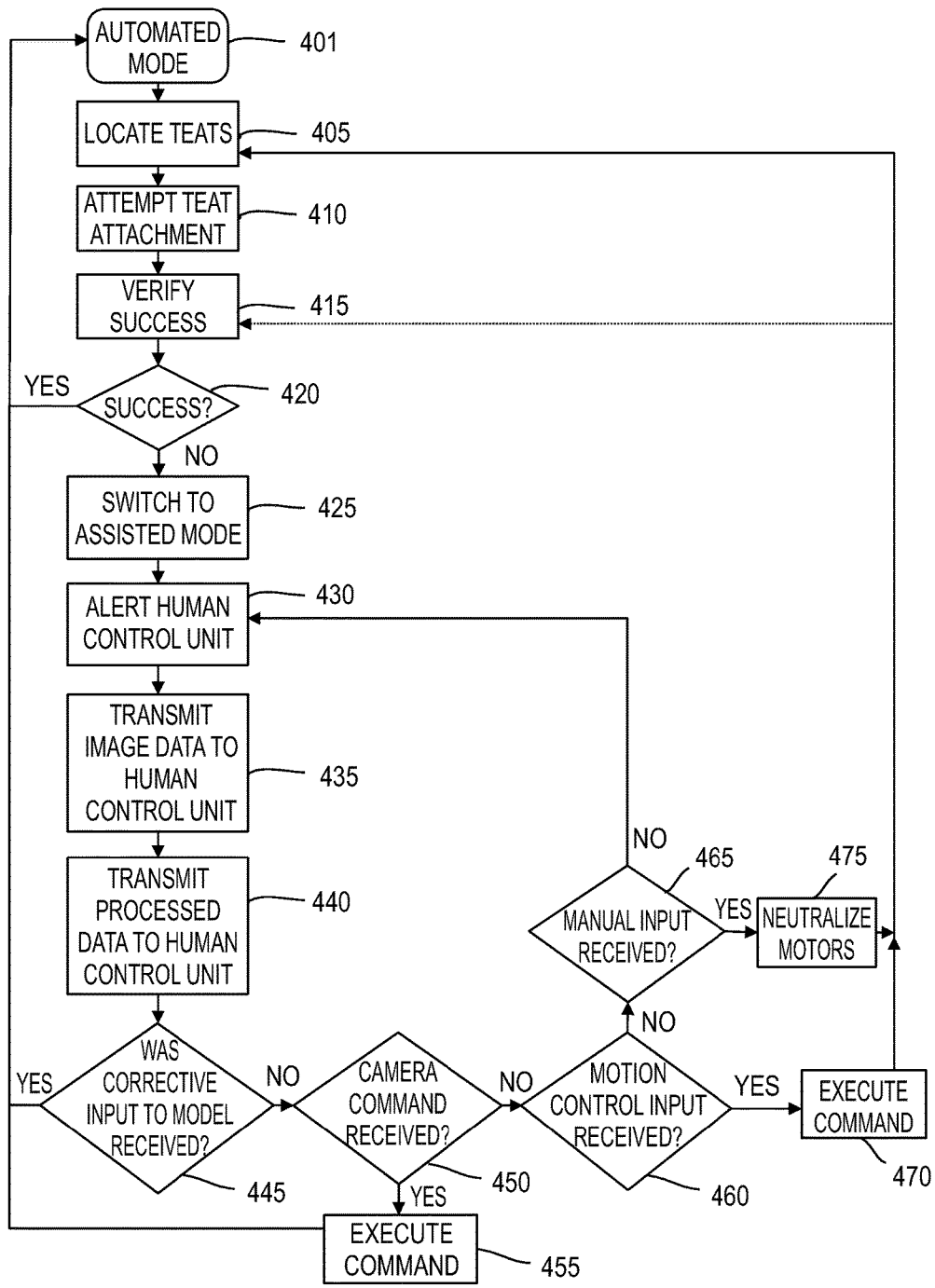
FIG. 7 is a simplified flow chart of an exemplary method for operating a milking robot with human assisted control in accordance with some embodiments of the present invention.

Reference is now made to FIG. 7 showing a simplified flow chart of an exemplary method for operating a milking robot with human assisted control in accordance with some embodiments of the present invention. Typically, a milking robot begins operation in an automated mode (block 401). Typically, during operation in an automated mode, the milking robot first identifies the teats and determines their location (block 405) and then attaches milking equipment, e.g. milking cluster to the teats (block 410) to perform one or more automated tasks on the teats, e.g. milking, cleansing teats and udder, pre-milking, and post-milking. Typically, during operation in the automated mode, location computation unit 125 determines 3D position and optionally orientation of the teats and motion control unit 120 sends commands to robot arms of the milking robot based on the determined location. Optionally, location computation unit 125 calculates a 3D model of the teats based on a captured image of the teats.

In some exemplary embodiments, the milking robot includes and/or is associated with one or more sensors for sensing successful completion of an automated task. According to some embodiments of the present invention, the sensor data is read to verify success of attachment (block 415). In some exemplary embodiments, failure is determined after a pre-defined number of failed attempts and/or after a pre-defined duration during which the failed task has been attempted. In some exemplary embodiments, failure of a task is due to failure in properly identifying the teats. Optionally, the milking robot may identify less than a predefined number of teats, e.g. less than 4 teats. Optionally, an object other than the teat is identified and/or more than a pre-defined number of teats are identified. In some exemplary embodiments, failure of a task is due to an error in locating the teat.

Typically, if it is determined that the task has been completed successfully (block 420), the milking robot continues to operate in an automated mode (block 401). Alternatively and according to some embodiments of the present invention, when a task has failed, the milking robot switches to an assisted mode (block 425). Typically, at the onset of the assisted mode, motion control unit 120 stops sending motion commands to the robotic arms 55 and waits to receive input from human operated control device 500. According to some embodiments of the present invention, an alert is provided (block 430) to inform stand-by supervisor 200 that assistance is required. Optionally, the alert is an audio alert and/or a visual alert provided by milking robot 300 and/or human operated control device 500, e.g. a message displayed on device 500. Optionally, the alert includes information describing the failed task. Optionally, the failed task is failure to attach the milking cluster and/or other milking equipment to the teats.

According to some embodiments of the present invention, during human assisted mode, image data captured by the milking robot is transmitted by controller 135 and displayed on human operated control device 500 for human inspection (block 435). Optionally, a captured image used to identify and locate the teats is transmitted and displayed on human operated control device 500. Optionally, the captured image includes images of the teats and the milking equipment. In some exemplary embodiments, the image data transmitted is a raw image, e.g. an image as captured by the camera. Optionally, the image data transmitted is processed image data, e.g. processed to remove distortions such as barrel distortion. According to some embodiments of the present invention, process data, e.g. teat location as calculated by the teat computation unit of the milking robot is transmitted by the milking robot for display on human operated control device 500 (block 440).

According to some embodiments of the present invention, based on the displayed and/or transmitted information stand-by supervisor 200 can identify cause of failure and provide input and/or commands to the milking robot to assist milking robot 300 in completing a task. Optionally, input and/or commands to milking robot 300 includes one or more of manual identification of the teats (by the supervisor), control commands to teat modeling unit 10, and/or control commands to robotic arms 55, e.g. controlling attachment of teat cluster, and control commands to milking equipment 600. In some exemplary embodiments, if milking robot 300 receives input to correct identification and/or location of the teat (block 445), location computation unit 125 recalculates location using location data received by human operated control device 500. In some exemplary embodiments, if milking robot 300 receives a command from the human operated control device 500 to alter FOV of camera 105 (450), controller 135 executes the command (block 455) and location computation unit 125 recalculates location based on the new FOV.

According to some embodiments of the present invention, if motion control commands are received for maneuvering milking equipment 600 (block 460), the commands are executed by motion control unit 120 (block 470). Optionally, sensor data, e.g. from sensor 41 is read to determine success (block 415). In some exemplary embodiments, if the robotic arms 55 senses manual manipulation (block 465), the robotic arms optionally neutralizes motors connected to the robotic arms (block 475) to allow the user to easily physically maneuver milking equipment 600. Optionally manual manipulation is sensed by monitoring current in motor and/or with dedicated sensors. Optionally, sensor data, e.g. from sensors 41 is read to affirm that the task has been successfully completed (block 415). According to some embodiments of the present invention, after the task has been successfully performed, the milking robot returns to the automated mode (block 401).

Figure 8:
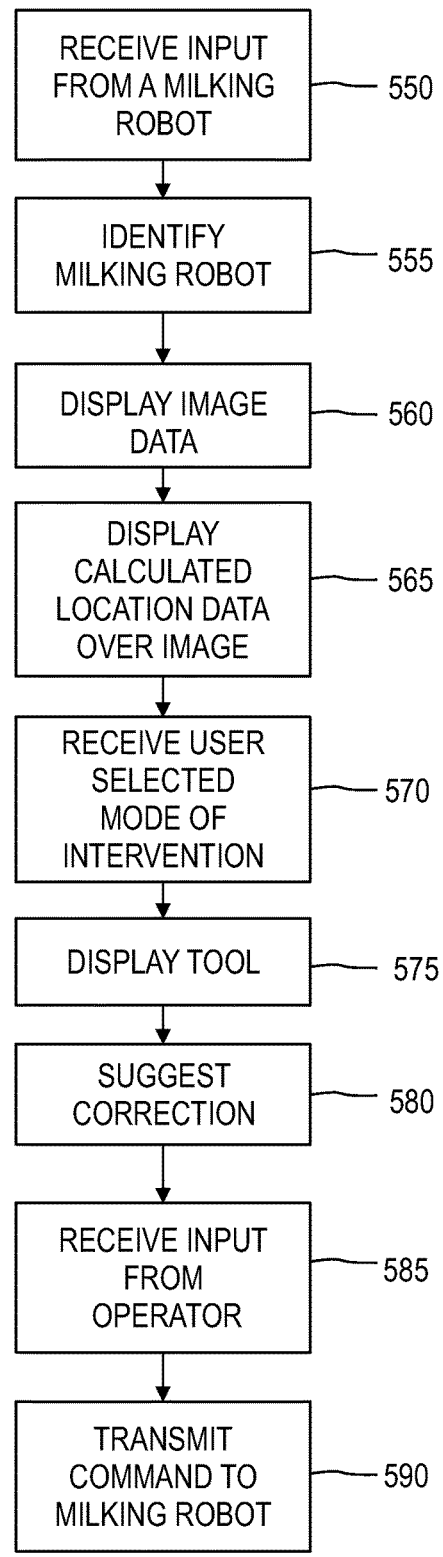
FIG. 8 is a simplified flow chart of an exemplary method for assisting a milking robot with a human operated control device in accordance with some embodiments of the present invention.

Reference is now made to FIG. 8 illustrating a simplified flow chart of an exemplary method for assisting a milking robot with a human operated control device in accordance with some embodiments of the present invention. According to some embodiments of the present invention, during operation of a milking robot 300, a human operated control unit 500 receives input from the milking robot (block 550). Transmittal of the input from the milking robot may be initiated by the milking robot and/or may be in response to a request by a stand-by supervisor. Optionally, input from the milking robot is received in response to failure to attach a milking cluster to the teats of an animal to be milked. Typically, the input received includes image data of the teats to be milked. Optionally, the input includes information regarding location of the teats as computed by the milking robot, position of the milking cluster, and/or information regarding an operational mode of the milking robot.

In some exemplary embodiments, upon receiving input, the human operated control device identifies the milking robot or the milking stall from which input was received (block 555). Typically, image data received is displayed on the human operated control device for inspection by the stand-by supervisor (block 560). In some exemplary embodiments, position of a teat as computed by the milking robot is displayed, e.g. displayed over image of the teats (block 565). Optionally, the human operated control device allows a user to select a mode of invention, e.g. a mode for assisting the milking robot (block 570) and the human operated control device displays tools for the selected mode (block 575). Exemplary modes of intervention may include for example, a mode for providing corrective action for correcting computed location of the teats, a mode for remotely controlling position of the camera capturing the image data, a mode for remotely controlling position the milking cluster, and/or a mode for remotely controlling operation of one or more units associated with the milking robot.

In some exemplary embodiments, the human operated control device may process received input and provide suggestions to the standby supervisor for corrective actions (block 580). Typically, the human operated control device receives input from the standby supervisor (block 585) and transmits commands to the milking robot based on the input from the standby supervisor (block 590).

Figure 9A:
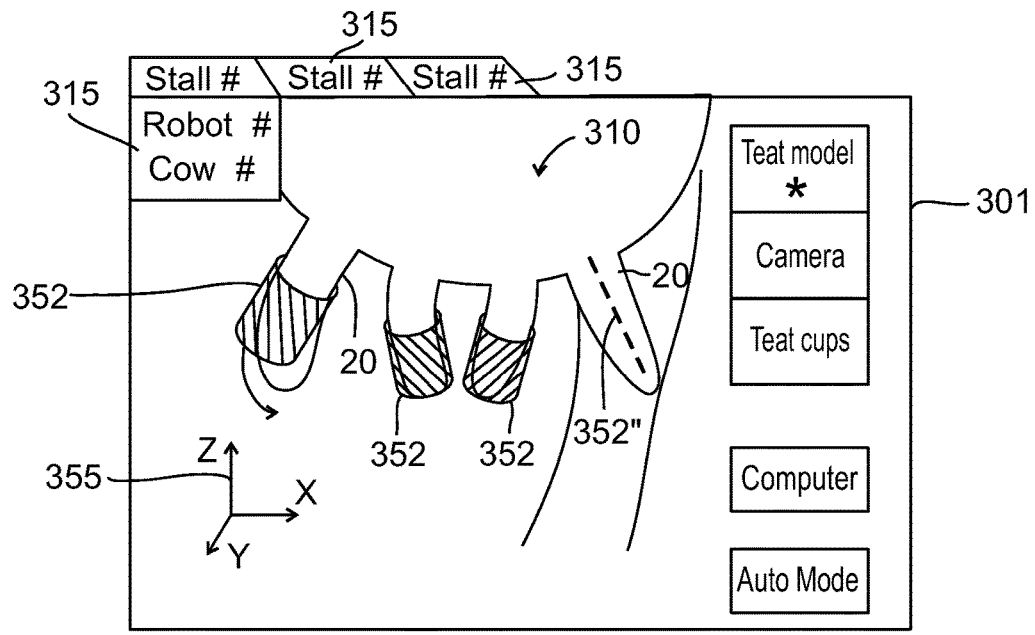
FIGS. 9A and 9B are simplified schematic drawings of an exemplary graphical user interface for correcting a computed model of the teats in accordance with some embodiments of the present invention.
Figure 9B:
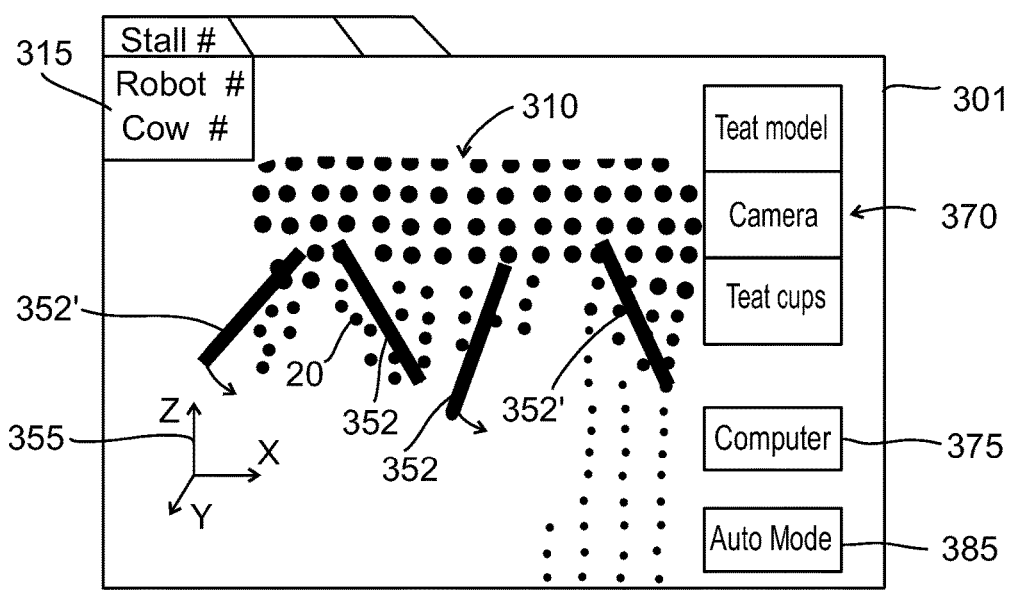

Reference is now FIGS. 9A and 9B illustrating simplified schematic drawings of an exemplary graphical user interface for providing human input for correcting a computed model of the teats in accordance with some embodiments of the present invention. According to some embodiments of the present invention, during a human assisted operation mode, a milking robot transmits captured images 310 of a region of interest, e.g. the teats or the teats together with a milking cluster to human operated control device 500 and the images are displayed on display 500 for inspection by supervisor 200. According to some embodiments of the present invention, an image 310 is displayed as part of a GUI 301 through which supervisor 200 can enter commands. Optionally, a video stream of images is transmitted in real time and displayed in GUI 301. In some exemplary embodiments, image 310 is an image captured with standard lighting (FIG. 9A) or with structured lighting (FIG. 9B). Optionally, image 310 is a same image used by location computation unit 125 for computing location of the teats. Optionally, location computation unit 125 based on a sensor other than an image sensor and camera 105 is added for human assisted control.

According to some embodiments of the present invention, if more than one milking robot 300 transmits information to human operated control device 500 at a same time, information obtained from different milking robots is displayed on separate windows and supervisor 200 can select a window to interface with. In some exemplary embodiments, GUI 301 includes tabs 315 indicating an origin of information, e.g. information indicating the stall and/or milking robot from which data is being received, information indicating a milking parlor from which information is being received and/or information identifying an animal in the stall.

According to some embodiments of the present invention, GUI 301 displays a plurality of GUI selection buttons 370 for assisting, controlling and/or monitoring different functions of milking robot 300. According to some embodiments of the present invention, supervisor 200 selects to inspect teat model computed by location computation unit 125. Optionally, GUI 301 for inspecting and/or correcting teat model is a default setting.

In some exemplary embodiments, GUI 301 includes one or more graphical object 352 that represents models of the teats as computed by location computation. According to some embodiments of the present invention, objects 352 are overlaid on image 310 in their computed position, so that a supervisor can detect errors in the model based on inspection of the overlaid display. In some exemplary embodiments, graphical object 352 has a same shape as a 3D model of a teat computed by location computation unit 125 (FIG. 9A). Optionally, graphical object 352 only indicates a location and orientation of an identified teat (FIG. 9B).

According to some embodiments of the present invention, graphical objects 352 are manipulated by supervisor 200 to indicate corrections to computed model. Optionally, supervisor 200 alters position or orientation of an object, e.g. graphical object 352'. Optionally, supervisor 200 adds a graphical object on a teat that was not identified, e.g. graphical object 352". Optionally, supervisor 200 deletes a graphical object positioned over an object hat is not a teat. Optionally, location computation unit 125 may have difficulty in distinguishing the teat from another objected imaged in image 310, e.g. a leg or tail of an animal, while supervisor 200 can easily distinguish when observing image 310 and provide that information to location computation unit 125. Optionally, when an animal has more than the expected number of teats, supervisor 200 can select the teats to be used for milking. According to some embodiments of the present invention, human operated control device 500 interprets graphical manipulation of objects 352 to input that can be communicated to location computation unit 125 for correcting the model. Optionally, the correct model is displayed to supervisor 200 for confirmation before milking robot switches back to automated mode.

According to some embodiments of the present invention, GUI 301 allows a supervisor to control positioning of camera 105 with a graphical object 355 (representing FOV of camera 105) so that teats 20 and graphical objects 352 can be viewed from various angles. Typically, in response to manipulating axes 355, camera 105 is moved to a new position and captures a new image and image 310 is updated. Typically, a GUI button 375 is selected by supervisor 200 to initiate a command to location computation unit to recompute models of the teats based on the input provided. Optionally, the updated model is also displayed to supervisor 200 for approval. The present inventor has found that errors in teat modeling can be quickly and intuitively identified and corrected by a supervisor using a GUI such as GUI 301. In some exemplary embodiments, GUI 301 additionally includes a GUI button 385 to return robot 300 to an automated mode.

Figure 10A:
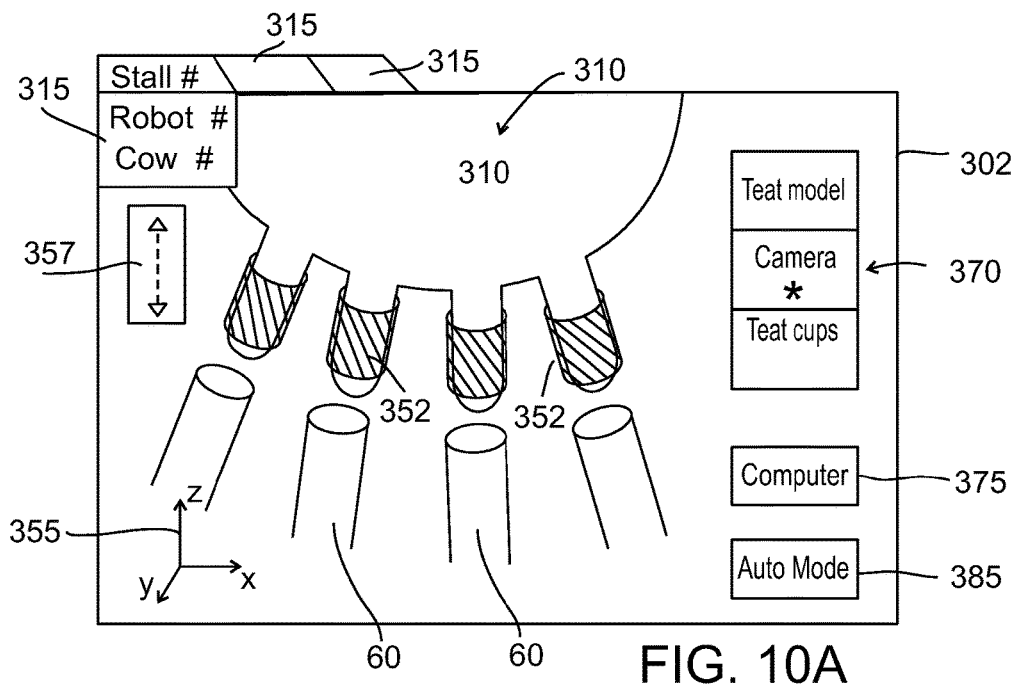
FIGS. 10A and 10B are simplified schematic drawings of an exemplary graphical user interface for providing human input for adjusting camera view in accordance with some embodiments of present invention.
Figure 10B:
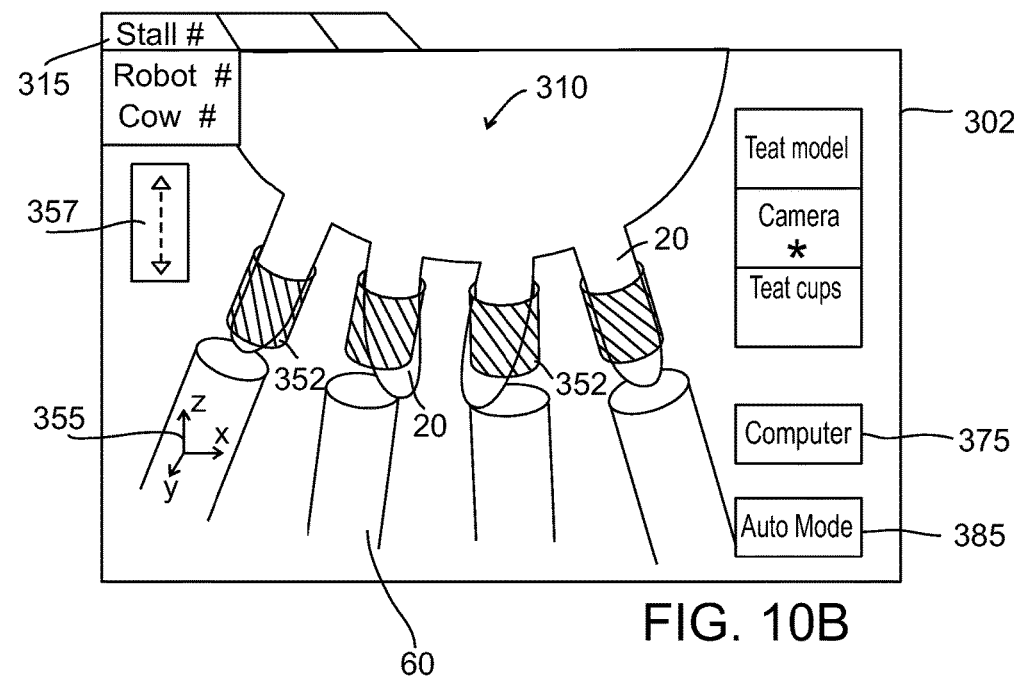

Reference is now made to FIGS. 10A and 10B illustrating simplified schematic drawings of an exemplary graphical user interface for providing human input for adjusting camera view in accordance with some embodiments of present invention. According to some embodiments of the present invention, GUI 302 for providing human input for adjusting camera view includes some of the features of GUI 301 but also includes additional features. According to some embodiments of the present invention, GUI 302 allows supervisor 200 to select an alternate FOV of camera 105 from which location computation unit 125 can compute a model of the teats. Optionally, image 310 includes an image of the teat cups 60 and position of the teats 20 and/or the teat model as represented by object 352 can be observed in relation to teat cups 60 in image 310. According to some embodiments of the present invention GUI 302 includes axes 355 (a GUI object, component or animation) that can be graphically manipulated to alter a FOV of camera 105. In some exemplary embodiments, GUI 302 includes an intensity adjusting scale 357 (a GUI object, component or animation) for adjusting intensity of illumination provided by illumination unit 115. According to some embodiments of the present invention, position and orientation of graphical object 352 is updated to correspond to a current field of view.

The present inventor has found that due to the 3D structure of the teats, an error in computation may not be apparent in the FOV used for computing the model, but may be apparent in a different FOVs. For example, in FIG. 10A, the model represented by graphical object 352 looks correct while in FIG. 10B showing the teat and teat model (and teat cups) from a different angle, the error is apparent. Optionally, a supervisor may select to recomputed a model of the teat using a FOV where the error was observed, e.g. FOV shown in FIG. 10B. Optionally, location computation unit 125 combines information from both FOV to compute the updated model.

In some exemplary embodiments, altering the FOV may help location computation unit 125 identify teats that were not identified and/or incorrectly identified. Optionally, supervisor 200 searches for a FOV where the teats can be more clearly depicted. In some exemplary embodiments, supervisor 200 adjusts parameters of illumination, e.g. intensity and/or color to help location computation unit 125 identify and locate the teats from the image data. Optionally, supervisor 200 selects recompute button 375 to initiate a command to recompute teat models with new parameters. In some exemplary embodiments, GUI 302 additionally includes a GUI button 385 to return robot 300 to an automated mode.

Figure 11:
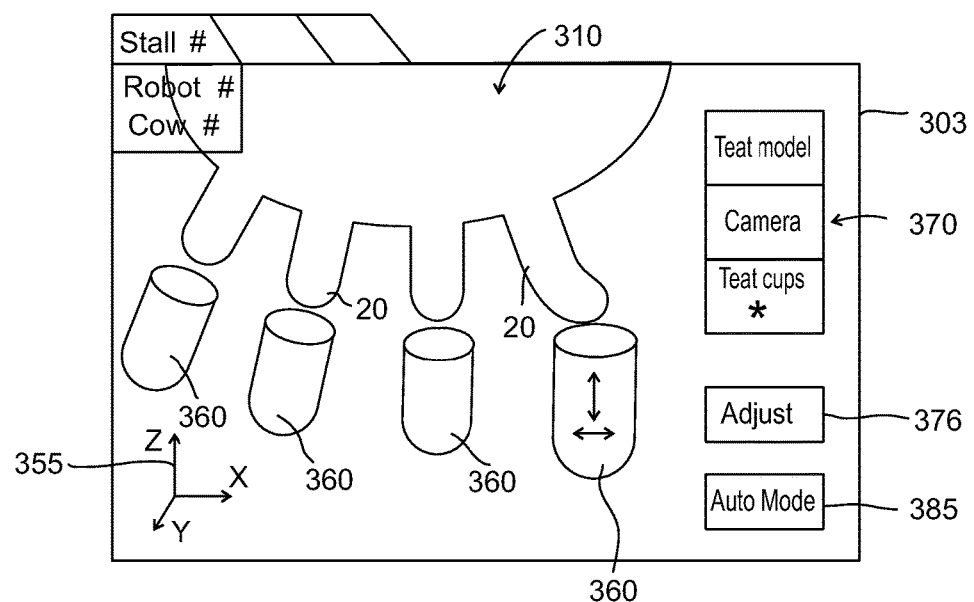
FIG. 11 is a simplified schematic drawing of an exemplary graphical user interface for providing human control of teat cups positioning in accordance with some embodiments of the present invention.

Reference is now made to FIG. 11 illustrating a simplified schematic drawing of an exemplary graphical user interface for providing human control of teat cups positioning in accordance with some embodiments of the present invention. According to some embodiments of the present invention, GUI 303 for providing human control of teat cups positioning includes some of the features of GUI 301 and 302 but also includes additional features. According to some embodiments of the present invention, supervisor 200 selects to maneuver a cluster (or other milking equipment) by remote control via human operated control device 500. According to some embodiments of the present invention, a GUI 303 displays image 310 and also displays graphical objects 360 representing position and orientation of the teat cups.

According to some embodiments of the present invention, supervisor 200 can select an object 360 and maneuver it to a desired position and orientation. Optionally, when a shape or orientation of a teat is atypical, supervisor may decide to remotely control the cluster instead of trying to correct the model. Changes in position and orientation of object 360 are translated by human operated control device 500 to commands to motion control unit 120 for moving the cluster, e.g. to attach the cluster to the teats. In some exemplary embodiments, commands are transmitted to motion control unit 120 after supervisor 200 selects GUI adjust button 376. Optionally, commands are transmitted as supervisor 200 manipulates object 360. In some exemplary embodiments, GUI 303 includes axes 355 that can be used to alter FOV of camera. Typically, when the FOV of the camera is altered, positions and orientations of objects 360 are altered to correspond to their positions in the new FOV.

According to some embodiments of the present invention, an image displayed by GUI 303 includes one or more robotic arms of milking robot 300. Optionally, GUI 303 additionally displays graphical objects representing position and orientation of the robotic arm. In some exemplary embodiments, supervisor can remotely maneuver the robotic arm based using information from the displayed image and/or displayed graphical object. Typically, the displayed image is updated periodically during the maneuvering. In some exemplary embodiments, milking robot 300 transmits images of milking equipment to clean and disinfect a teat before milking, e.g. milking equipment that includes a dedicated teat cup, a brush and/or spray. Optionally, supervisor is able to remotely control cleaning and disinfecting the teat with human operated control unit 500.

According to some embodiments of the present invention, GUI 301, 302 and/or 303 reports and/or displays information about one or more problems detected with operation of milking robot 300, e.g. attachment failures, communication problems, technical failures of robotic arms. The detected problems reported may be problems detected by milking robot 300 and/or by human operated control device 500 based on input received from milking robot 300.

It is appreciated that although the present invention has been mostly described in reference to a human assisted milking robot for attaching a milking cluster to teats of a dairy animal, the system and methods described herein can be applied to performing other milking tasks on a dairy animal.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The terms "comprises", "comprising", "includes", "including", "having" and their conjugates mean "including but not limited to."

The term "consisting of" means "including and limited to."

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A milking robot for operating milking equipment comprising:
    a location computation unit configured to compute a three dimensional model of at least one teat for milking during an automated mode of operation;
    at least one robotic arm or robotic platform configured to maneuver milking equipment;
    a motion control unit configured to control movement of the at least one robotic arm or robotic platform; and
    a controller configured to:
        control operation of the milking robot and the milking equipment;
        detect failure of the location computation unit to locate the at least one teat during the automated mode of operation;
        operate in the automated mode of operation as long as the failure is not detected by the controller; and
        operate in an assisted mode of operation based on the controller detecting the failure; and
    a control device including a human input device from which human input is received;
    wherein during the assisted mode of operation, the control device is configured:
        to be in remote communication with the controller,
        to display a graphical representation of the three dimensional model overlaid on a real time image of the at least one teat;
        to correct positioning of the graphical representation with respect to the real time image based on a user graphically manipulating the graphical representation;
        to translate the corrected position indicated by the user to data based on which the location computation unit corrects the three dimensional model; and
        to transmit the data to the location computation unit via the controller;
    wherein the milking robot is configured to locate the at least one teat based on the data from the correction.

2. The milking robot of claim 1, wherein the controller is adapted to switch from the automated mode of operation to the assisted mode of operation in response to failure to attach a milking cluster to the dairy animal within a predefined time limit or after a predefined number of trials.

3. The milking robot of claim 1, wherein the location computation unit is configured to update the three dimensional model based on the data received from the control device.

4. The milking robot of claim 3, wherein the controller is adapted to control the motion control unit based on the update to the three dimensional model.

5. The milking robot of claim 3, wherein the controller is adapted to control the milking equipment based on the update to the three dimensional model.

6. The milking robot of claim 1, wherein the real time image may further include one or more additional images of the at least one teat for milking captured by the location computation unit.

7. The milking robot of claim 1, wherein the controller is adapted to transmit information regarding positioning of the at least one robotic arm or robotic platform.

8. The milking robot of claim 1, wherein the controller is adapted to transmit information regarding an operational status of the milking robot or the milking equipment.

9. The milking robot of claim 1, wherein the controller is adapted to transmit information regarding a dairy animal to be milked by the milking robot.

10. The milking robot of claim 1 comprising at least one sensor for sensing attachment of a milking cluster to a dairy animal.

11. The milking robot of claim 10, wherein the at least one sensor includes a sensor for sensing attachment of the at least one teat cup to a teat for milking.

12. The milking robot of claim 11, wherein the at least one sensor is an optical sensor mounted on the teat cup, wherein the optical sensor is adapted to sense a break in the line of sight due to insertion of the at least one teat into the teat cup.

13. The milking robot of claim 1, wherein the controller is configured to control attaching a milking cluster to teats of a dairy animal.

14. The milking robot of claim 1, wherein the three dimensional model is configured to define a location and an orientation of the at least one teat.

15. A method for performing milking tasks on a dairy animal with a milking robot, the method comprising:
    operating a milking robot in an automated mode without human intervention, wherein the milking robot is configured to compute a three dimensional model of at least one teat of the dairy animal for milking, to maneuver milking equipment with at least one robotic arm or robotic platform of the milking robot and to perform a milking task on the at least one teat;
    detecting failure in locating the at least one teat, wherein the failure is detected by the milking robot;
    switching operation of the milking robot from the automated mode of operation to an assisted mode of operation based on detecting the failure;
    transmitting information via remote communication from the milking robot to a control device that is operable by a human during the assisted mode of operation;
    displaying a graphical representation of the three dimensional model overlaid on a real time image of the at least one teat;
    receiving a correction to a position of the graphical representation with respect to the real time image based on a user graphically manipulating the graphical representation, from the control device that is operable by a human responsive to the information transmitted and the displaying;
    translating the correction data to correct the three dimensional model;

transmitting the data to the milking robot; and locating the at least one teat based on the three dimensional model and the data transmitted to the milking robot.

16. The method of claim 15, further comprising switching operation of the milking robot from the assisted mode of operation to the automated mode of operation in response to completing the milking task.

17. The method of claim 15, wherein transmitting information from the milking robot to the control device includes transmitting image data captured by the milking robot.

18. The method of claim 15, wherein the transmitting information from the milking robot to the control device includes transmitting information regarding a computed location of teats for milking.

19. The method of claim 15, wherein the milking task is completed based on the data from the correction.

20. The method of claim 15, wherein the milking task is completed based on the control device providing a command to alter a position of a camera of the robotic milking system.

21. The method of claim 15, wherein the milking task is completed based on the control device providing a command for remotely controlling the at least one robotic arm or the at least one robotic platform.

22. The method of claim 15, wherein the milking task is completed based on the control device providing a command for updating an operating parameter of the milking robot or of milking equipment associated with the milking robot.

23. The method of claim 15, wherein the milking task includes attaching a milking cluster to teats of the dairy animal.

* * * * *